US008747036B2

(12) United States Patent
Kato et al.

(10) Patent No.: US 8,747,036 B2
(45) Date of Patent: Jun. 10, 2014

(54) POWER TOOLS

(75) Inventors: Kazuya Kato, Anjo (JP); Takuji Kimura, Anjo (JP)

(73) Assignee: Makita Corporation, Anjo-Shi (JP)

( * ) Notice: Subject to any disclaimer, the term of this patent is extended or adjusted under 35 U.S.C. 154(b) by 621 days.

(21) Appl. No.: 13/051,480

(22) Filed: Mar. 18, 2011

(65) Prior Publication Data

US 2011/0229283 A1 Sep. 22, 2011

(30) Foreign Application Priority Data

Mar. 19, 2010 (JP) ................................ 2010-063845
Feb. 4, 2011 (JP) ................................ 2011-022550

(51) Int. Cl.
*B23C 1/20* (2006.01)
*B27C 5/10* (2006.01)

(52) U.S. Cl.
USPC .................... 409/182; 144/154.5; 144/136.95

(58) Field of Classification Search
USPC ......................... 409/175, 181–182, 206, 209; 144/154.5, 136.95
IPC ..................................... B27C 5/10; B23C 1/20
See application file for complete search history.

(56) References Cited

U.S. PATENT DOCUMENTS 1,611,381 A * 12/1926 Salsbury ....................... 409/182
2,855,963 A * 10/1958 Potter ........................ 144/134.1
2,960,126 A * 11/1960 De Man .................... 144/134.1
4,239,428 A * 12/1980 Berzina ......................... 409/182
4,319,860 A * 3/1982 Beares .......................... 409/182
7,121,775 B2 * 10/2006 Onose et al. .................. 409/182
2008/0183240 A1 * 7/2008 Tehrani et al. .................. 607/42

FOREIGN PATENT DOCUMENTS

JP A-63-120081 5/1988
JP 2000025007 A * 1/2000
JP A 2002-052505 2/2002
JP A 2002-234001 8/2002
JP A-2005-305683 11/2005
JP 2008073988 A * 4/2008
JP 2011152752 A * 8/2011

OTHER PUBLICATIONS

Oct. 24, 2013 Submission of Published Documents or Like submitted in Japanese Patent Application No. 2011-22550 (with translation).

* cited by examiner

*Primary Examiner* — Daniel Howell
(74) *Attorney, Agent, or Firm* — Oliff PLC

(57) ABSTRACT

A power tool includes a base and a drive unit movable relative to the base and having a spindle and a drive device for rotatably driving the spindle. The power tool further includes a movable member mounted to the base and movable in a first mode and a second mode. A first device is coupled between the movable member and the drive unit and moves the drive unit relative to the base when the movable member moves in the first mode. A second device is coupled to the movable member and is configured to fix the drive unit in position relative to the base when the movable member moves in the second mode.

18 Claims, 10 Drawing Sheets

POWER TOOLS

This application claims priority to Japanese patent application serial numbers 2010-65845 and 2010-22550, the contents of which are incorporated herein by reference.

The present invention relates to power tools that can be used for machining workplaces, such as wooden workpieces, for trimming edges of the workpieces or forming grooves in the workpieces.

DESCRIPTION OF THE RELATED ART

Power tools generally known as trimmers have been used for machining workpieces, such as wooden workplaces, for trimming edges of the workpieces or forming grooves in the workpieces. In general, this kind of power tools includes a base for contacting a workpiece, and a motor unit supported on the base and producing a rotational drive force. The motor unit has a drive motor disposed therein for rotatably driving a spindle. Depending on the mode of machining operation, such as a mode for machining edges or a mode for forming grooves, a suitable bit is chosen and mounted to the spindle.

In the case of this kind of power tools, in order to properly machine the edges or form grooves, it is necessary to appropriately position the bit relative to the workpiece. Therefore, this kind of power tools is configured to be capable of adjusting a relative position between the base for contacting the workpiece and the motor unit supported on the base, for example, as disclosed in Japanese Laid-Open Patent Publication Nos. 2002-52505 and 2002-234001. With this configuration of the power tools, it is possible to adjust the position of the motor unit relative to the workplace by adjusting the position of the motor unit relative to the base. Therefore, the position of the bit mounted to the spindle relative to the workpiece can also be adjusted.

According to the arrangements of the above publications, two mechanisms including an adjusting mechanism for adjusting the position of the motor unit relative to the base and a fixing mechanism for fixing the motor unit to the base are provided on the base at different positions from each other.

Because the two mechanisms are provided at different positions on the base, the base has a relatively large size for installation of these mechanisms, and therefor; the power tool has a relatively large size as a whole.

Therefore, there is a need in the art for a power tool having an adjusting mechanism for adjusting the position of a drive unit relative to a base without accompanying substantial increase of the size of the power tool.

According to the present teaching, a power tool includes a base and a drive unit movable relative to the base and having a spindle and a drive device for rotatably driving the spindle. The power tool further includes a movable member mounted to the base and movable in a first mode and a second mode. A first device is coupled between the movable member and the drive unit and moves the drive unit relative to the base when the movable member moves in the first mode. A second device is coupled to the movable member and is configured to fix the drive unit in position relative to the base when the movable member moves in the second mode. Therefore, the movable member and the first device constitute a position adjusting mechanism for adjusting the position of the base and the drive unit relative to each other. On the other hand, the movable member and the second device constitute a position fixing mechanism for fixing the position of the base and the drive unit relative to each other

DETAILED DESCRIPTION OF THE INVENTION

Figure 1:
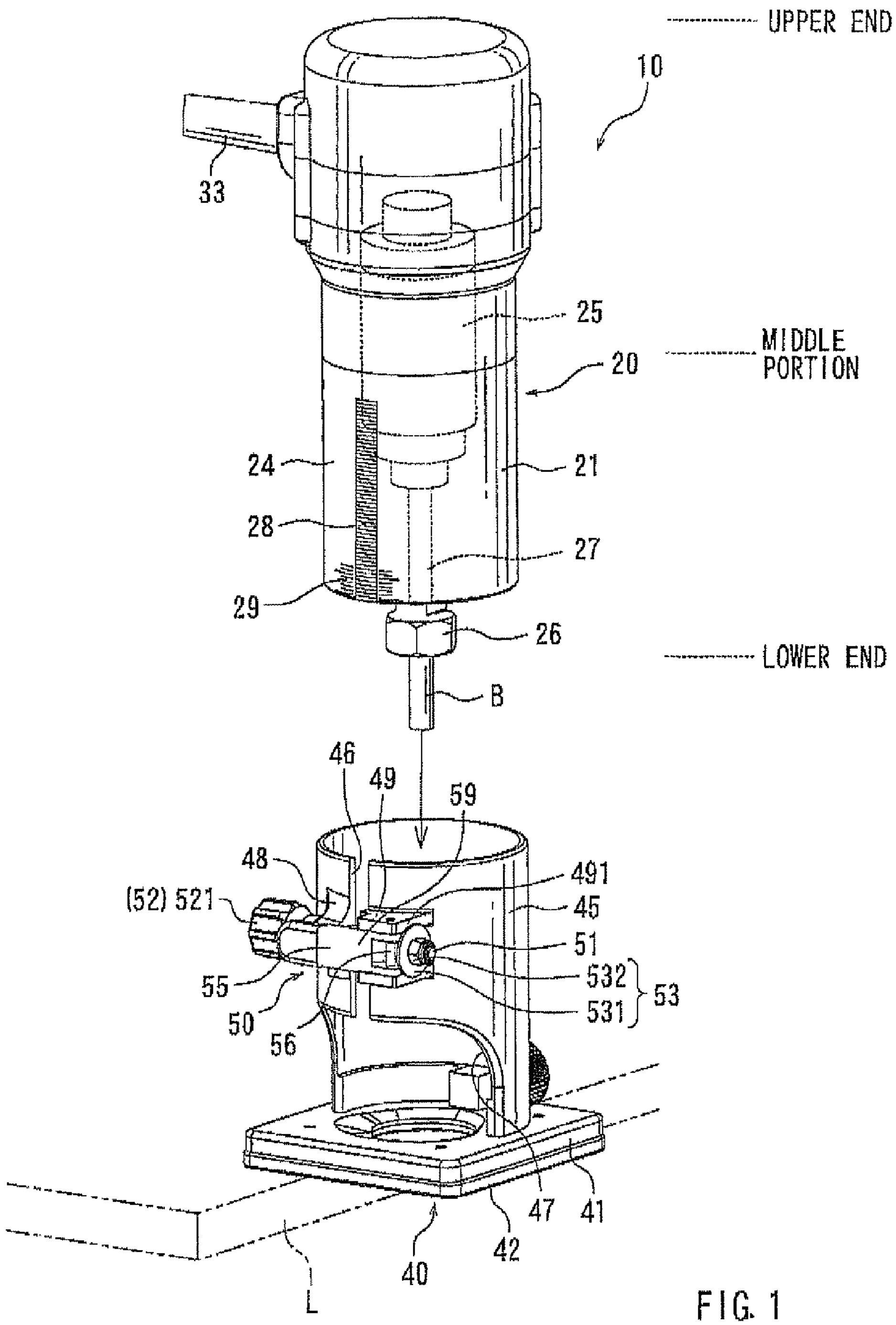
FIG. 1 is a perspective view of a power tool according to a first example and showing a motor unit and a base in the state of being separated from each other.

Each of the additional features and teachings disclosed above and below may be utilized separately or in conjunction with other features and teachings to provide improved power tools. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, a power tool includes a drive unit and a base. The drive unit has a spindle and is configured to rotatably drive the spindle. The spindle is configured to be able to attach a tool bit used for machining a workpiece. The base is adapted to be placed on the workpiece. The drive unit has a housing that has an outer circumferential surface. The base has a base plate for contacting the workplace and a tubular holding portion extending from the base plate and positioned to be opposed to the outer circumferential surface of the housing. The power tool further includes a relative position adjusting mechanism and a relative position fixing mechanism. The relative position adjusting mechanism is configured to adjust a position of the drive unit relative to the base. The relative position fixing mechanism is configured to fix a position of the drive unit relative to the base. At least one member is used commonly between the relative position adjusting mechanism and the relative position fixing mechanism. Thus, one member or two or more members may be used commonly between the relative position adjusting mechanism and the relative position fixing mechanism.

With this arrangement, it is possible to position the relative position adjusting mechanism and the relative position fixing mechanism at one location. Therefore, the number of locations necessary for providing these mechanisms can be reduced. In addition, the number of parts can be minimized and it is possible to configure the base to have a small size and to eventually configure the power tool to have a small size.

The at least one member may include a support shaft member mounted to the tubular holding portion of the base and extending in a tangential direction of the tubular holding portion. The relative position adjusting mechanism may include the support shaft member and a rotational member mounted on the support shaft member. The rotational member is configured to rotate along the outer circumferential surface of the housing in a direction parallel to a central axis of the drive unit, so that the position of the drive unit relative to the base changes as the rotational member rotates along the outer circumferential surface of the housing. The support shaft member has a first end portion and a second end portion opposite to the first end portion with respect to an axial direction. The first end portion of the support shaft member is rotatably supported by a first part of the tubular holding portion of the base, and the second end portion of the support shaft member is rotatably supported by a second part of the tubular holding portion of the base. The second part, is spaced from the first part in a circumferential direction of the tubular holding portion. The relative position fixing mechanism includes the support shaft member and is configured to be able to move the support shaft member in the axial direction, so that the first part and the second part move toward each other to reduce a circumferential length of the tubular support portion for tightening the tubular support portion around the outer circumferential surface of the housing.

Therefore, the support shaft member supporting the rotational member of the relative position adjusting mechanism serves as a part of the relative position fixing mechanism. Thus, the support shaft member used as a part of the relative position adjusting mechanism is also used as a part of the relative position fixing mechanism.

The rotational member may be a pinion gear and the relative position adjusting mechanism may further include a rack engaging the pinion gear. The rack is disposed on the outer circumferential surface of the housing of the drive unit and extends along a direction of movement of the drive unit relative to the base. Therefore, the position of the drive unit relative to the base can be easily accurately adjusted.

The relative position fixing mechanism may further include a shift mechanism for moving the support shaft member in the axial direction. The shift mechanism may include a cam portion rotatable about a rotational axis and an operation lever portion extending from the cam portion in a radial direction with respect to the rotational axis of the cam portion. The cam portion acts on the support shaft member to move the support shaft member in the axial direction according to the rotational position of the cam portion. The operation lever portion is operable for rotating the cam portion.

It is only necessary for the cam portion to move the support shaft member according to the rotation of the cam portion. Therefore, the cam portion may be provided on the side of the tubular holding portion or may be provided on the side of the support shaft member.

With the above arrangement, the support shaft member can be moved in the axial direction according to the rotational position of the cam portion that is rotated by the operation of the operation lever portion. Therefore, the axial movement of the support shaft member may be used for urging one of the first part and the second part of the tubular holding portion to move toward the other, so that the circumferential length of the tubular support portion can be reduced for tightening the tubular support portion around the outer circumferential surface of the housing. As a result, the operation for fixing the drive unit in position relative to the base can be easily preformed by simply pivoting the operation lever portion. Therefore, the operability of the power tool can be improved.

The cam portion may be rotatably supported on a rotary support shaft that can move relative to the tubular support portion in response to the rotation of the cam portion, and the rotary support shaft may be supported on the support shaft member such that the rotary support shaft urges the support shaft member to move in the axial direction relative to the tubular holding portion in response to the rotation of the cam portion.

Therefore, the movement of the support shaft member relative to the tubular holding portion can be caused by the movement of the cam portion relative to the tubular holding portion according to the rotation of the cam portion. Hence, the support shaft member moves in the axial direction together with the cam portion. As a result, the operation for tightening the tubular holding portion around the outer circumferential surface of the drive unit can be stably performed.

The cam portion may have an outer circumferential surface serving as a cam surface for contacting a contact member disposed on the side of the tubular support portion when the cam portion acts on the support shaft member for moving the support shaft member in the axial direction. The outer circumferential surface of the cam portion is oriented in a direction opposite to the moving direction of the support shaft member.

Because the outer circumferential surface of the cam portion for contacting the contact member is oriented in the direction opposite to the moving direction of the support shaft member, it is possible to position the outer circumferential surface of the cam portion not to be oriented outwardly. Therefore, it is possible to provide a neat appearance.

FIRST EXAMPLE

Figure 2:
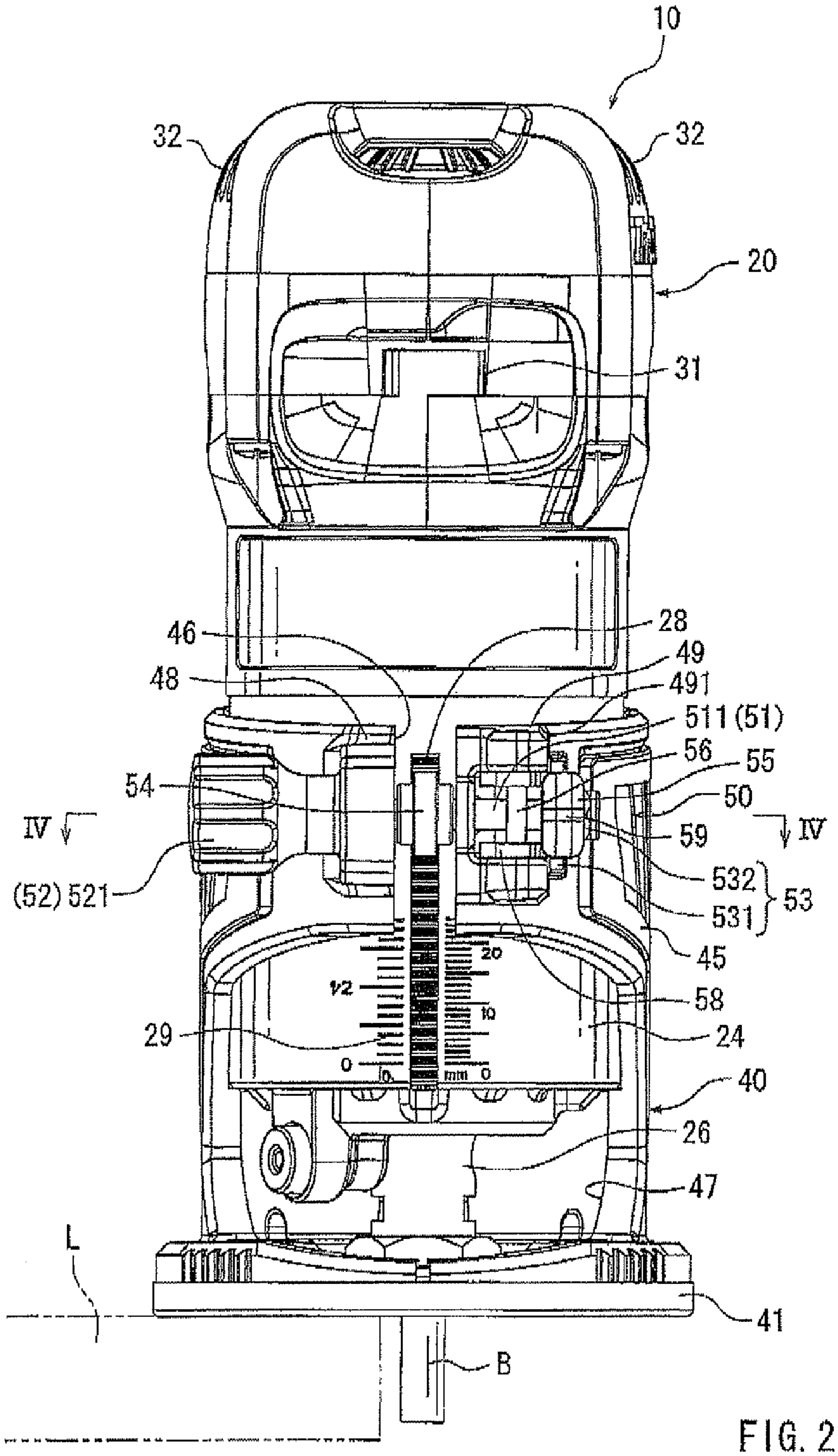
FIG. 2 is a front view of the power tool and showing the state where a position of the tool unit relative the base can be adjusted.

A first example will be now described with reference to FIGS. 1 to 5. Referring to FIGS. 1 and 2, there is shown a power tool 10 according to this example, which is generally called a "trimmer." The power tool 10 can be used for machining a workpiece L for machining (trimming) an edge of the workpiece L or for forming a groove into the workpiece L. As shown in FIG. 2, the power tool 10 is placed on the workpiece L during its use. A tool bit B is mounted to the power tool 10 for machining the workpiece L.

Referring back to FIG. 1, the power tool 10 generally includes a drive unit 20 and a base 40. The base 40 supports the drive unit 20 and can be placed on the workpiece L.

First, the drive unit 20 will be described. As shown in FIG. 1, the drive unit 20 has a housing 21 configured generally as an enclosure, a drive motor mechanism 25 disposed within the housing 21, and a spindle 27 rotatably driven by the drive motor mechanism 25. The reference numeral 33 denotes a power source cord that extends from the drive unit 20 and is connectible to a power source for supplying an electric power to the drive unit 20.

The housing 21 is configured as an enclosure for storing the drive motor mechanism 25 that includes an electric motor (not shown). As shown in FIGS. 1 and 2, the housing 21 has a substantially cylindrical configuration having different outer diameters between its upper portion and a lower portion. More specifically, the lower portion is a portion positioned between an intermediate portion and one end on a bit mounting side (lower end as viewed in FIGS. 1 and 2) of the housing 21. Here, the bit mounting side means the side of mounting the bit (B). The lower portion has a substantially cylindrical configuration with a uniform outer diameter and can be inserted into the base 40 as will be explained later. On the other hand, the upper portion is a portion positioned between the intermediate portion and the other end on a cord attaching side (upper end as viewed in FIGS. 1 and 2). Here, the cord mounting side means the side of attaching the power source cord 33. The upper portion is suitably configured to have a switch 31 and an air introduction window 32. The switch 31 is operable for operating the power tool 10. A cooling air can flow into the housing 21 through the air introduction window 32 for cooling the drive motor mechanism 25. The lower portion of the housing 21 can be inserted into the base 40 and can then be held by the base 40 as will be explained later.

Figure 4:
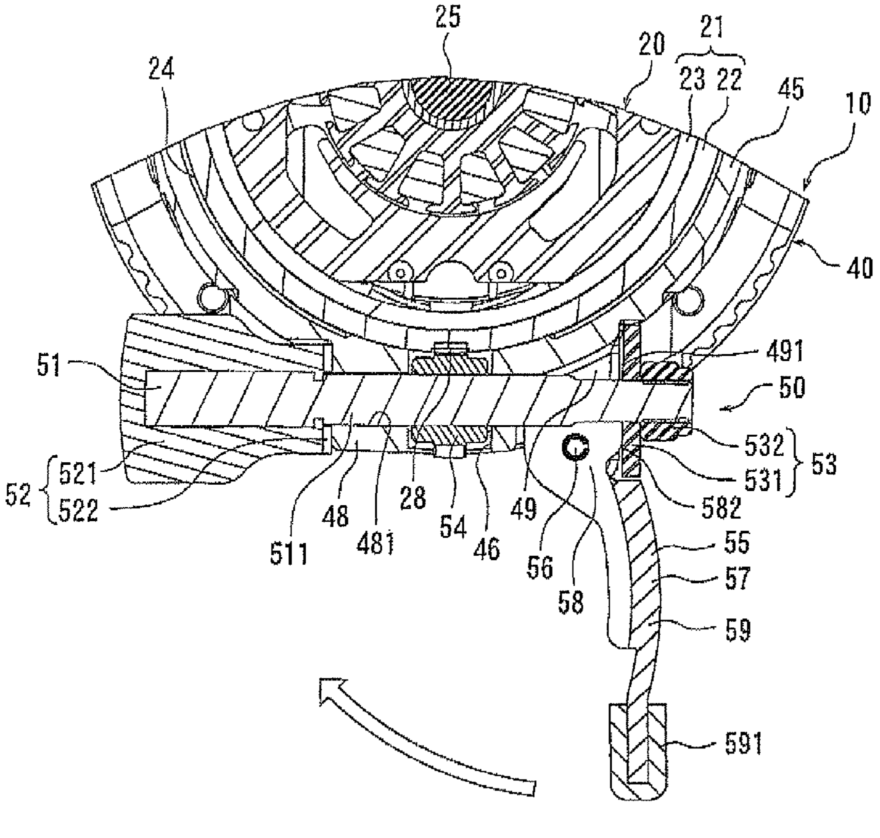
FIG. 4 is a sectional view taken along line IV-IV in FIG. 2.
Figure 5:
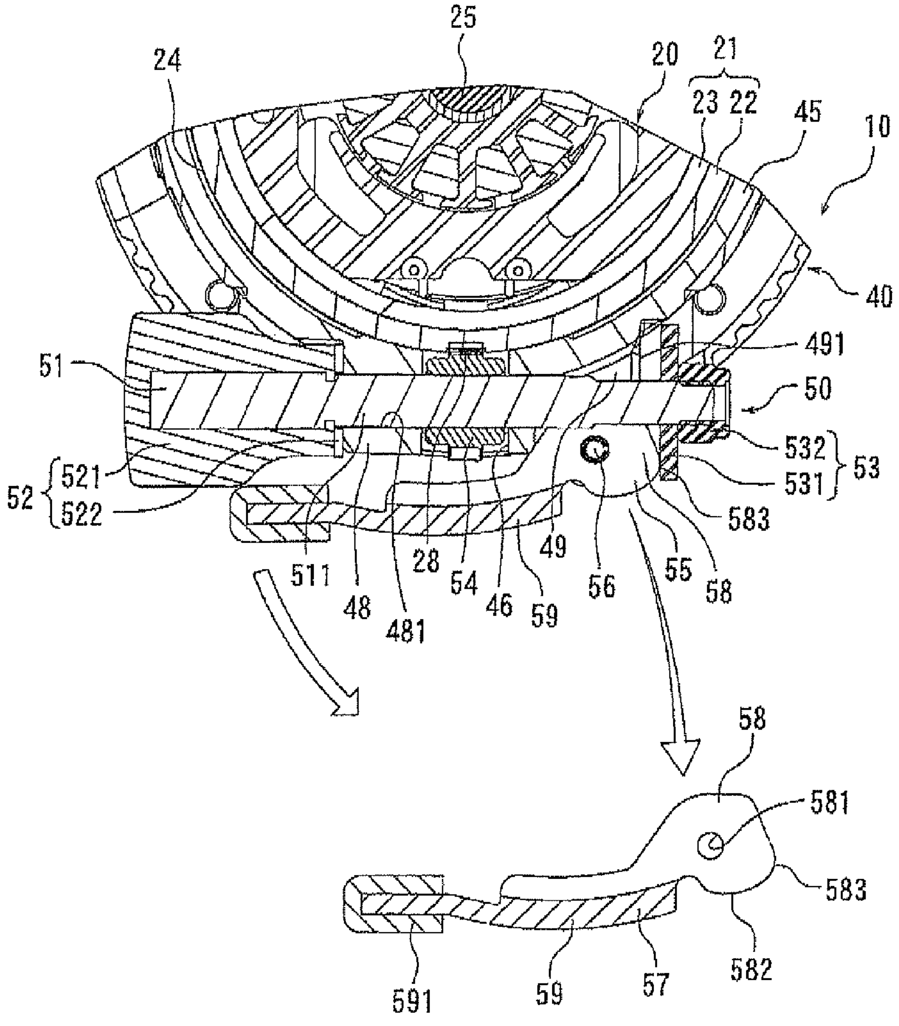
FIG. 5 is a sectional view taken along line V-V in FIG. 3.

Referring to FIGS. 4 and 5, the housing 21 has a double layer structure as viewed in a cross section perpendicular to the longitudinal axis of the housing 21 by an inner cylindrical layer and an outer cylindrical layer adjacently overlaid on the inner cylindrical layer to cover its outer circumference. More specifically, the housing 21 includes a cylindrical outer housing part 22 and a cylindrical inner housing part 23 disposed on the radially outer side and the radially inner side of the housing 21, respectively. The outer housing part 22 is made of aluminum. The inner housing part 23 is made of resin and has an electric insulation property. Therefore, a metallic appearance is given to the drive unit 20 by the outer housing part 22, while an electric insulation property is given by the inner housing part 23.

As shown in FIGS. 1 and 2, the lower portion of the housing 21 has an outer circumferential surface configured as a smooth holding surface 24 having a uniform diameter for inserting into the base 40. As will be explained later, a tubular holding portion 45 of the base 40 is tightened around the holding surface 24, so that the holding surface 24 is brought to contact in surface-to-surface contact relationship with the inner circumferential surface of the tubular holding portion 45.

As shown in FIGS. 1 and 2, a rack 28 is provided on the holding surface 24 of the housing 21 and extends along an inserting direction (vertical direction in FIGS. 1 and 2) that is a direction for inserting the drive unit 20 into the base 40 and coincides with, a direction for changing the position of the drive unit 20 relative to the base 40. The rack 28 has a flat base plate and a plurality of teeth formed thereon. The teeth engage a pinion gear 54 that will be explained later. A scale 29 is marked on the holding surface 24 on opposite sides of the rack 28 for giving indication to the operator of a position of the drive unit 20 relative to the base 40. The rack 28 may be attached to the holding surface 24 or may be formed integrally with the holding surface 24.

As shown in FIG. 1, the drive motor mechanism 25 having the motor for rotatably driving the spindle 27 is disposed within the housing 21. The drive motor mechanism 25 may further include a suitable reduction gear mechanism that is generally used in conjunction with the motor. The spindle 27 is configured to be capable of mounting the tool bit B that is suitably chosen depending on the mode of the machining operation of the workpiece L. More specifically, a chuck device 26 known as a collet cone is provided at a leading end (lower end as viewed in FIG. 1) of the spindle 27. The chuck device 26 can hold the bit B, so that the bit B is coupled to and fixed in position relative to the spindle 27.

The base 40 is disposed on the side of the workpiece L (lower side as viewed in FIGS. 1 and 2) with respect to the drive unit 20 constructed as described above and will now be explained. The base 40 is configured to contact the upper surface of the workpiece L while supporting the drive unit 20. More specifically, in the state that the base 40 is in contact with the upper surface of the workpiece L, the position of the drive unit 20 relative to the base 40 can be adjusted and fixed by an adjusting and fixing mechanism 50. Adjusting and fixing the position of the drive unit 20 relative to the base 40 results the state that the drive unit 20 is supported on the base 40 while the position of the drive unit 20 being adjusted relative to the workpiece L. Therefore, the tool bit B coupled to and supported by the spindle 27 can be set at a desired position relative to the workpiece L.

As shown in FIGS. 1 and 2, the base 40 generally includes a base plate 41 for contacting with the workpiece L, the tubular holding portion 45 upright from the base plate 41, and the adjusting and fixing mechanism 50 disposed at the tubular holding portion 45.

The base plate 41 has a substantially flat plate-like configuration and is made of transparent or translucent resin material. The base plate 41 has a workpiece contact surface 42 disposed on the bit mounting side (lower side as viewed in FIGS. 1 and 2). The workpiece contact surface 42 is configured as a flat surface for contacting the workpiece L in surface-to-surface contact relationship therewith. The tubular holding portion 45 extends upward from a surface on the opposite side of the workpiece contact surface 42 of the base plate 41 in a direction intersecting with the extending direction of the base plate 41. The tubular holding portion 45 has a substantially tubular shape. When the drive unit 20 is inserted into the tubular holding portion 45, the tubular holding portion 45 extends along the holding surface 24 of the drive unit 20 and is opposed to the holding surface 24. In this example, a part of the tubular holding portion 45 is cut out. More specifically, the tubular holding portion 45 is cut out to form a slit 46 and an open window 47 formed in continuation with each other. The slit 46 extends in parallel to the axial direction of the tubular holding portion 45. When the drive unit 20 is inserted into the base 40, the slit 46 is opposed to the rack 28 disposed on the holding surface 24 of the housing 21, so that the slit 46 serves like a window, through which the rack 28 is exposed to the outside. The slit 46 also serves to allow reduction of the circumferential length of the tubular holding portion 45. The open window 47 is opened over an area to allow the operator to view the chuck device 26 of the drive unit 20 through the open window 47. Therefore, the provision of the open window 47 is advantageous from a viewpoint of facilitating the machining operation of the workpiece L. The tubular holding portion 45 configured in this way can hold the holding surface 24 of the drive unit 20 in surface-to-surface contact relationship therewith as it is tightened around the holding surface 24 by the adjusting and fixing mechanism 50. When the holding and fixing state given by the adjusting and fixing mechanism 50 is released, the position of the drive unit 20 relative to the base 40 can be changed due to the resilient restoration in the circumferential direction of the tubular holding portion 45.

A first support projection 48 and a second support projection 49 are provided on the tubular holding portion 45 at positions adjacent to the slit 46 on opposite sides in the circumferential direction of the slit 46. The first and second projections 48 and 49 may be formed integrally with the tubular holding portion 45. Alternatively, the first and second projections 48 and 49 may be formed separately from the tubular holding portion 45 and may be attached to the tubular holding portion 45. The first and second support projections 48 and 49 support the adjusting and fixing mechanism 50 (including a support shaft member 51 and a cam lever member 55) as will be explained later.

More specifically, the first support projection 48 positioned on the left side of the slit 46 as viewed in FIG. 2 rotatably supports a portion on the side of an operation portion 52 (i.e., on the side of one end) of the support shaft member 51. As shown in FIG. 1, the first support projection 48 is configured like a substantially rectangular piece projecting from the tubular holding portion 45 and is formed with an inserting hole 481 shown in FIGS. 4 and 5, which allows insertion of the support shaft member 51.

On the other hand, the second support projection 49 positioned on the right side of the slit 46 rotatably supports a portion on the side of an engaging portion 53 (i.e., on the side of the other end) of the support shaft member 51. The second support projection 49 also supports a rotary support shaft 56 for rotation of the cam lever member 55.

Figure 3:
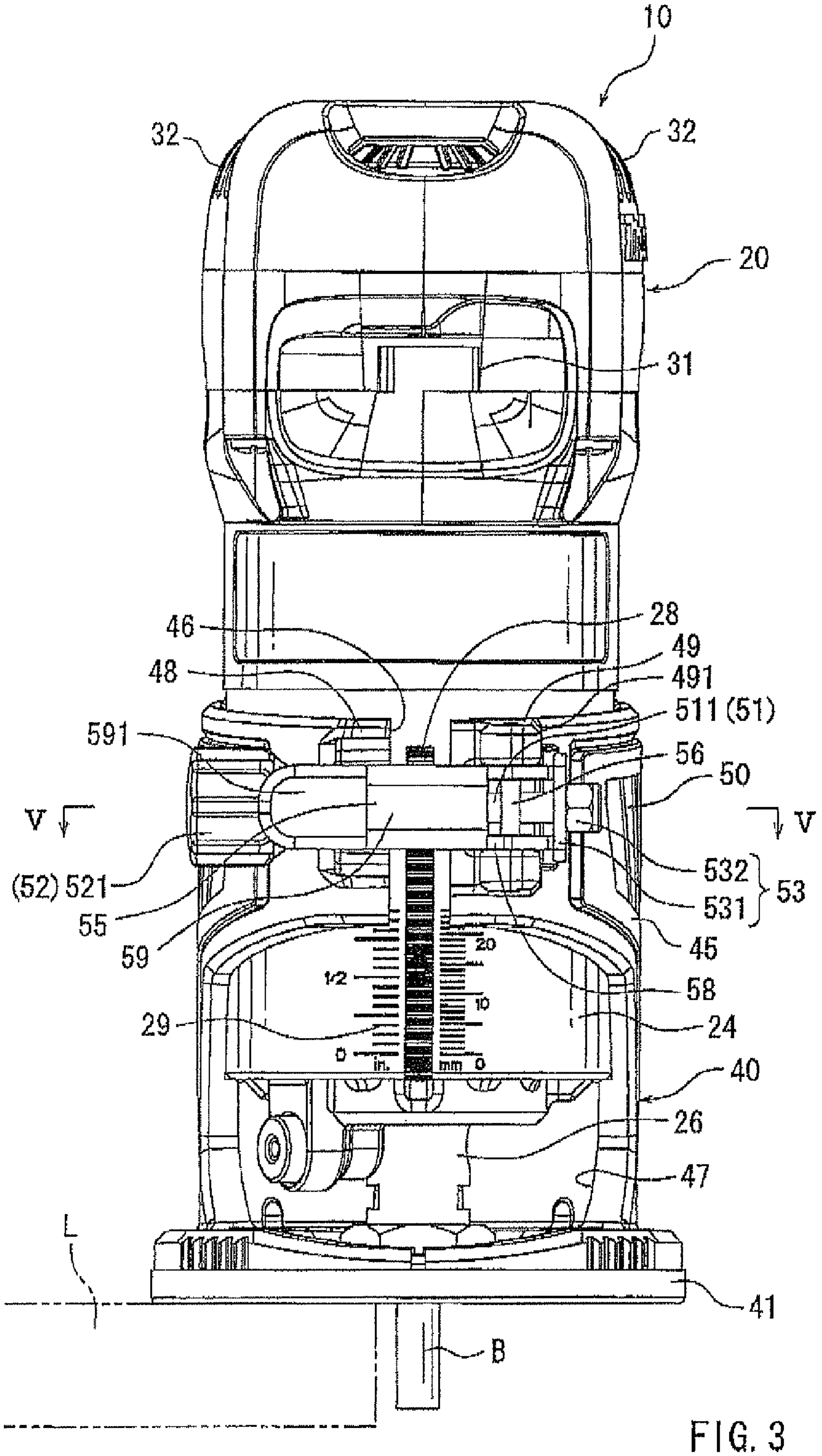
FIG. 3 is a front view similar to FIG. 3 but showing the state where the tool unit is fixed in position relative to the base.

As shown in FIG. 1, the second support projection 49 includes a pair of upper and lower rectangular pieces projecting from the tubular holding portion 45 for supporting the rotary support shaft 56 of the cam lever member 55 such that the rotary support shaft 56 is held from opposite sides as shown in FIGS. 2 and 3. A side surface of the second support projection 49 on the side opposite to the slit 46 is configured as an engaging surface 491 for engaging the engaging portion 53 of the support shaft member 51.

The adjusting and fixing mechanism 50 provided on the tubular holding portion 45 will now be described. The adjusting and fixing mechanism 50 is configured to have two different functions, i.e., a function as a relative position adjusting mechanism for adjusting the position of the drive unit 20 relative to the base 40 and a function as a relative position fixing mechanism for fixing the position of the drive unit 20 relative to the base 40. To this end, the adjusting and fixing mechanism 50 includes the support shaft member 51 that is disposed at one location and used commonly for these two different functions.

The adjusting and fixing mechanism 50 generally includes the support shaft member 51, the pinion gear 54 and the cam lever member 55. The support shaft member 51 and the pinion gear 54 provide the relative position adjusting function, and the support shaft member 51 and the cam lever member 55 provide the relative position fixing function.

The support shaft member 51 is mounted to the tubular holding portion 45 such that it extends along a tangential line of the outer circumferential surface of the tubular holding portion 45. More specifically, the support shaft member 51 has the operation portion 52 and the engaging portion 53 that are disposed at opposite ends of the support shaft member 51 so as to be positioned on opposite sides with respect to the slit 46. More specifically, as shown in FIG. 1, the support shaft member 51 is rotatably supported by the first and second support projections 48 and 49 that are disposed on the tubular holding portion 45 at positions adjacent to opposite sides of the slit 46. Thus, as shown in FIGS. 4 and 5, one end of the support shaft member 51 on the side of the operation portion 52 is inserted into the insertion hole 481 formed in the first support projection 48, so that one end of the support shaft member 51 is supported by the first support projection 48. On the other hand, the other end of the support shaft member 51 on the side of the engaging portion 53 is engaged by the engaging surface 491 formed on the second support projection 49, so that the other end of the support shaft member 51 is supported by the second support projection 49.

As shown in FIGS. 4 and 5, the support shaft member 51 includes a shaft body 511, the operation portion 52 disposed at one end of the shaft body 511, and the engaging portion 53 disposed at the other end of the shaft body 511. The pinion gear 54 is fitted on the intermediate portion of the support shaft member 51. In this example, the support shaft member 51 has a substantially rod-like shape. Portions of the support shaft member 51, where the operation portion 52, the engaging portion 53 and the pinion gear 54 are mounted, are cut to have non-circular cross sectional configurations for preventing rotation of these parts relative to the support shaft member 51. The operation portion 52 has a knob portion 521 and a washer 522. The knob portion 521 is made of suitable resin. The washer 522 can slide on the first support projection 52 when the support shaft member 51 rotates relative to the first support projection 52. The engaging portion 53 includes a washer 531 and a fastener 532. The washer 531 engages the engaging surface 491 of the second support projection 49 but can slide on the engaging surface 491 when the support shaft member 51 rotates relative to the second support projection 49. The fastener 532 serves to fasten the washer 531 to the support shaft member 51 not to move in the axial direction. In this example, the fastener 532 is a nut engaging a corresponding threaded portion formed on the end portion of the support shaft member 51. However, the fastener 532 may be fixed to the end portion of the support shaft member 51 by using a screw or any other suitable fixing device. The washer 531 of the engaging portion 53 serves as a contact surface, with which first and second portions 582 and 583 of the outer circumferential surface of a cam portion 58 of the cam lever member 55 can contact.

The pinion gear 54 engages the rack 28 provided on the holding surface 24 on the outer circumferential surface of the housing 21 of the drive unit 20. The pinion gear 54 serves as a rotary member that constitutes the relative position adjusting mechanism together with the support shaft member 51. The pinion gear 54 is supported on the support shaft member 51 and rotates to move along the holding surface 24 in a direction parallel to the central axis of the drive unit 20. Thus, when the operator rotates the knob portion 521 to rotate the support shaft member 51, the pinion gear 54 also rotates together with the support shaft member 51. Then, the pinion gear 54 rotates along the rack 28, so that the support shaft member 51 including the pinion gear 54 changes its position relative to the rack 28. In other words, the drive unit 20 having the rack 28 changes its position relative to the base 40 that supports the support shaft member 51.

The cam lever member 55 will now be described with reference to FIGS. 4 and 5. The cam lever member 55 serves as a shift mechanism for shifting the support shaft member 51 relative to the second support projection 49 in a right direction as viewed in FIGS. 4 and 5, which is a direction from the side of the operation portion 52 of the support shaft member 51 toward the side of the engaging portion 53. In addition, the cam lever member 55 constitutes the relative position fixing mechanism together with the support shaft member 51.

The cam lever member 55 generally includes the rotary support shaft 56 and a cam lever body 57. The rotary support shaft 56 is rotatably supported by the second projection 49. The cam lever body 57 is rotatably supported by the rotary support shaft 56 and includes the cam portion 58 and an operation lever portion 59. The rotary support shaft 56 extends vertically as viewed FIGS. 1 and 2 and has opposite ends that are rotatably supported by the upper and lower rectangular pieces of the second support projection 49, respectively. Therefore, the cam lever body 57 can pivot about the rotary support shaft 56 substantially within a horizontal plane as shown in FIGS. 4 and 5.

As also shown in a state separated from the rotary support shaft 56 in FIG. 5, the cam portion 58 is positioned proximal to the rotary support shaft 56 and the operation lever portion 59 extends in a radial direction from the cam portion 58. The cam portion 58 has a shaft support hole 581 formed therein for insertion of the rotary support shaft 56. With the rotary support shaft 56 inserted into the shaft support hole 581, the cam lever member 55 can pivot between a relative position adjusting position shown in FIGS. 2 and 4 and a relative position fixing position shown in FIGS. 3 and 5.

The operation lever portion 59 can be grasped by the operator for pivoting the cam lever member 55 and is integrated with the cam portion 58. In this example, the operation lever portion 59 has a configuration suitably curved to facilitate the operation by the operator. In addition, a cover 591 made of resin is attached to an end portion of the operation lever portion 59 so as to cover the end portion, so that the operator can firmly grasp the operation lever portion 59.

As the cam lever member 55 pivots, a point of the outer circumferential surface of the cam portion 58, which contacts the washer 531 of the engaging portion 53, may vary. Thus, when the cam lever member 55 is positioned at the relative position adjusting position shown in FIG. 4 (or FIG. 2), the first portion 582 of the outer circumferential surface contacts the washer 531 of the engaging portion 53. On the other hand, when the cam lever member 55 is positioned at the relative position fixing position shown in FIG. 5 (or FIG. 3), the second portion 583 of the outer circumferential surface contacts the washer 531. Here, the distance between the first portion 582 and the central axis of the shaft support hole 581 receiving the rotary support shaft 56 and the distance between the second portion 583 and the central axis of the shaft support hole 581 are set to be different from each other. More specifically, the distance between the second portion 583 and the central axis of the shaft support hole 581 is set to be longer than the distance between the first portion 582 and the central axis of the shaft support hole 581.

Therefore, when the cam lever member 55 is positioned at the relative position adjusting position, the washer 531 of the engaging portion 53 contacts the first portion 582 of the cam portion 58 and also contacts the engaging surface 491 of the second support projection 49 as shown in FIG. 4. On the other hand, when the cam lever member 55 is positioned at the relative position fixing position, the washer 531 of the engaging portion 53 contacts the second portion 583 of the cam portion 58 as shown in FIG. 5. Thus, as the cam lever member 55 pivots, the engaging portion 53 of the support shaft member 51 moves relative to the tubular holding portion 45, and therefore, the support shaft member 51 moves relative to the tubular holding portion 45. More specifically, as the cam lever member 55 pivots from the relative position adjusting position to the relative position fixing position, the support shaft member 51 moves relative to the second support projection 49 in a direction from the side of the operation portion 52 of the support shaft member 51 toward the side of the engaging portion 53 (i.e., the right direction as viewed in FIG. 5). Therefore, the first support projection 48 and the second support projection 49 (i.e., parts of the tubular holding portion 45 positioned on opposite sides with respect to the slit 46) are urged to move toward each other, so that the circumferential length of the tubular holding portion 45 is reduced to narrow the width of the slit 46. Due to this reduction of the circumferential length of the tubular holding portion 45, the tubular holding portion 45 can be tightened around the holding surface 24 on the outer circumference of the drive unit 20.

On the other hand, as the cam lever member 55 pivots from the relative position fixing position to the relative position adjusting position, the support shaft member 51 moves relative to the second support projection 49 in the opposite direction, so that the washer 531 of the engaging portion 53 is brought to contact the first portion 582 of the cam portion 58 and to also contact the engaging surface 491 of the second support projection 491 as shown in FIG. 4. Therefore, the circumferential length of the tubular holding portion 45 is increased to release tightening around the holding surface 24 of the drive unit 20. Hence, the position of the drive unit 20 can be changed relative to the tubular holding portion 45. Thus, rotating the support shaft member 51 via the knob portion 521 causes rotation of the pinion gear 54, so that the pinion gear 54 moves along the rack 28 to cause change of position of the drive unit 20 having the rack 28 relative to the base 20.

According to the power tool 10 of this example constructed as described above, the adjusting and fixing mechanism 50 serving as the relative position adjusting mechanism and also as the relative position fixing mechanism is disposed at one location of the tubular holding portion 45 of the base 40, and the relative position adjusting mechanism and the relative position fixing mechanism include a component or a part that is commonly used for these mechanisms. Because these two different mechanisms are disposed at one location, it is possible to minimize the number of locations necessary for providing these mechanisms. In addition, due to the use of the common part, the number of parts can be minimized. Therefore, the base 40 can be constructed to have a small size as a whole.

More specifically, the support shaft member 51 that supports the pinion gear 54 (rotary member) constituting the relative position adjusting mechanism also serves as a part of the relative position fixing mechanism for reducing the circumferential length of the tubular holding portion 45. Thus, the support shaft member 51 serves as a part that is used commonly for the two mechanisms. Because the support shaft member 51 is a primary part of the two mechanisms, it is possible to reduce the number of parts and to eventually reduce the size of the base 40 and the power tool 10 having the base 40.

Further, according to the power tool 10 of this example, adjustment of the position of the drive unit 20 relative to the base 40 is made by means of the rack 28 (provided on the holding surface 24 or the outer circumferential surface of the drive unit 20) and the pinion gear 54 engaging the rack 28. Therefore, adjustment of the position of the drive unit 20 relative to the base 40 can be easily accurately performed.

Furthermore, according to the power tool 10 of this example, the support shaft member 51 moves relative to the tubular holding portion 45 in response to the pivoting position of the cam lever member 55. More specifically, the support shaft member 51 moves in a direction from the side of the operation portion 52 toward the engaging portion 53 to force the second support projection 49 of the tubular holding portion 45 to move toward the first support projection 48 for reducing the circumferential length of the tubular holding portion 45. In other words, due to the cam action of the second portion 583 of the cam lever member 55, the first projection 48 is urged to move toward the second projection 49 via the support shaft member 51, so that the tubular holding portion 45 resiliently deforms to reduce its diameter. Therefore, the tubular holding portion 45 is tightened around the holding surface 24 of the drive unit 20, resulting in that the drive unit 20 is fixed in position relative to the base 40. As the cam lever member 55 pivots from the relative position fixing position to the relative position adjusting position, the tubular holding portion 45 resiliently recovers its shape to that shown in FIGS. 2 and 4. When the cam lever member 55 reaches the relative position adjusting position, no substantial force is applied to the support shaft member 51 by the cam lever member 55. In this way, the drive unit 20 can be fixed to and released from the base 40 by simply pivoting the operation lever portion 59 of the cam lever member 55. Therefore, the power tool 10 is improved in its operability.

SECOND EXAMPLE

A power tool 60 according to a second example will now be described with reference to FIGS. 6 to 10. The power tool 60 of this example is a modification of the power tool 10 of the first example. Therefore, in FIGS. 6 to 10, like members are given the same reference signs as the first example, and the description of these members will not be repeated.

Figure 6:
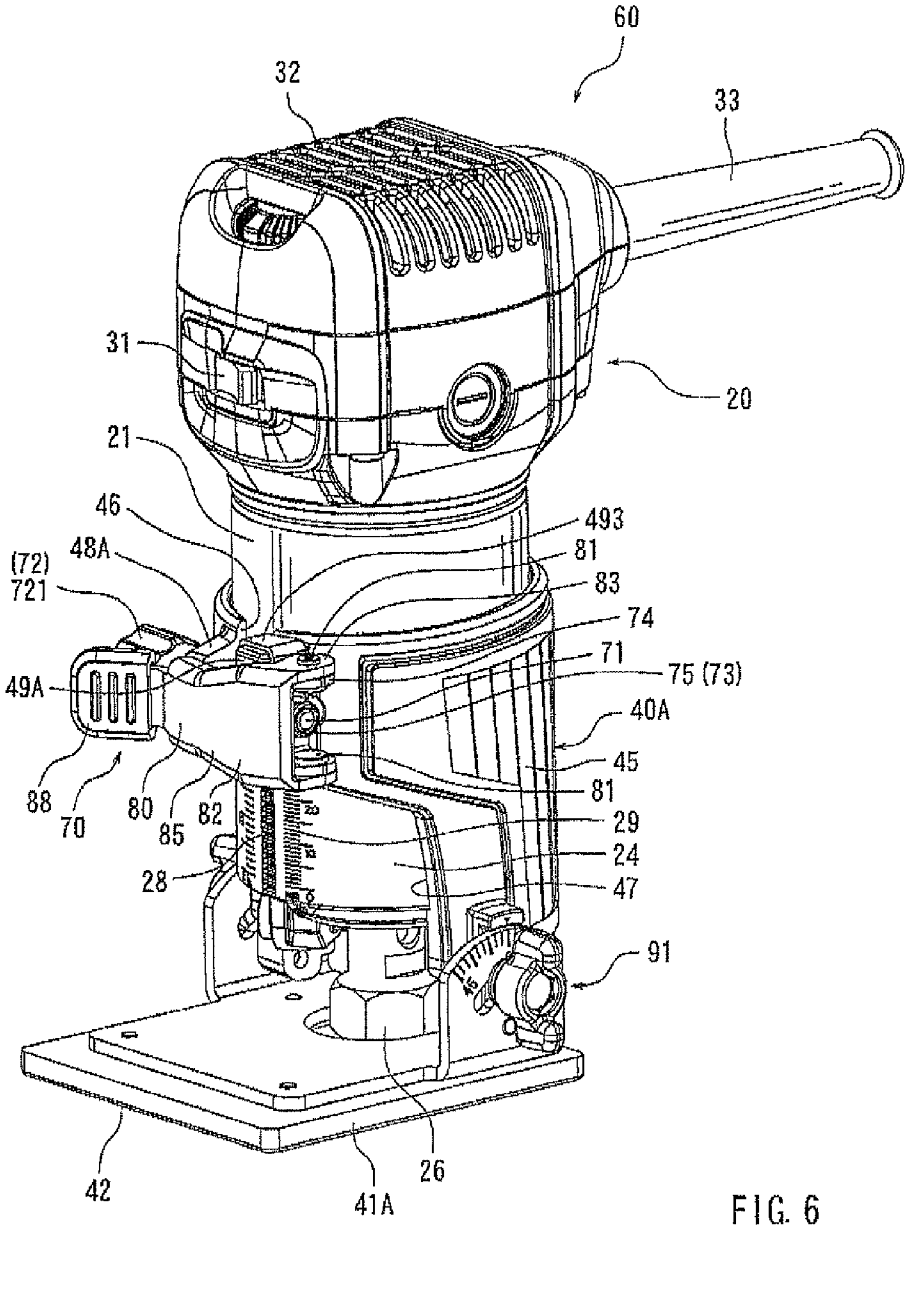
FIG. 6 is a perspective view of a power tool having a tillable base according to a second example.

In the configuration shown in FIG. 6, the power tool 60 has a base 40A having a base plate 41A configured to be tiltable. To this end, a tilt mechanism 91 is mounted to the base plate 41A. One the other hand, in the configuration shown in FIGS. 7 to 10, the base 40A has a base plate 41B that is similar to the base 41 of the first example and is non-tiltable. In other respect, the construction of the power tool 60 shown in FIG. 6 and that shown in FIGS. 7 to 10 are the same. A measuring plate holding mechanism 95 is provided on the base plate 41B.

The power tool 60 is different from the power tool 10 of the first example primarily in the construction of an adjusting and fixing mechanism 70. Therefore, the description of the power tool 60 will be focused on the adjusting and fixing mechanism 70.

As described above, the power tool 60 includes the base 40A and the adjusting and fixing mechanism 70 provided on the base 40A. The construction of the base 40A is substantially the same as the base 40 of the first example except for the arrangement of the adjusting and fixing mechanism 70. Thus, the base 40A can be placed on the upper surface of the workpiece L and can support the drive unit 20. Therefore, similar to the first example, the adjusting and fixing mechanism 70 is constructed to be able to adjust the position of the drive unit 20 relative to the base 40A and to be able to fix the drive unit 20 in position relative to the base 40A.

Figure 7:
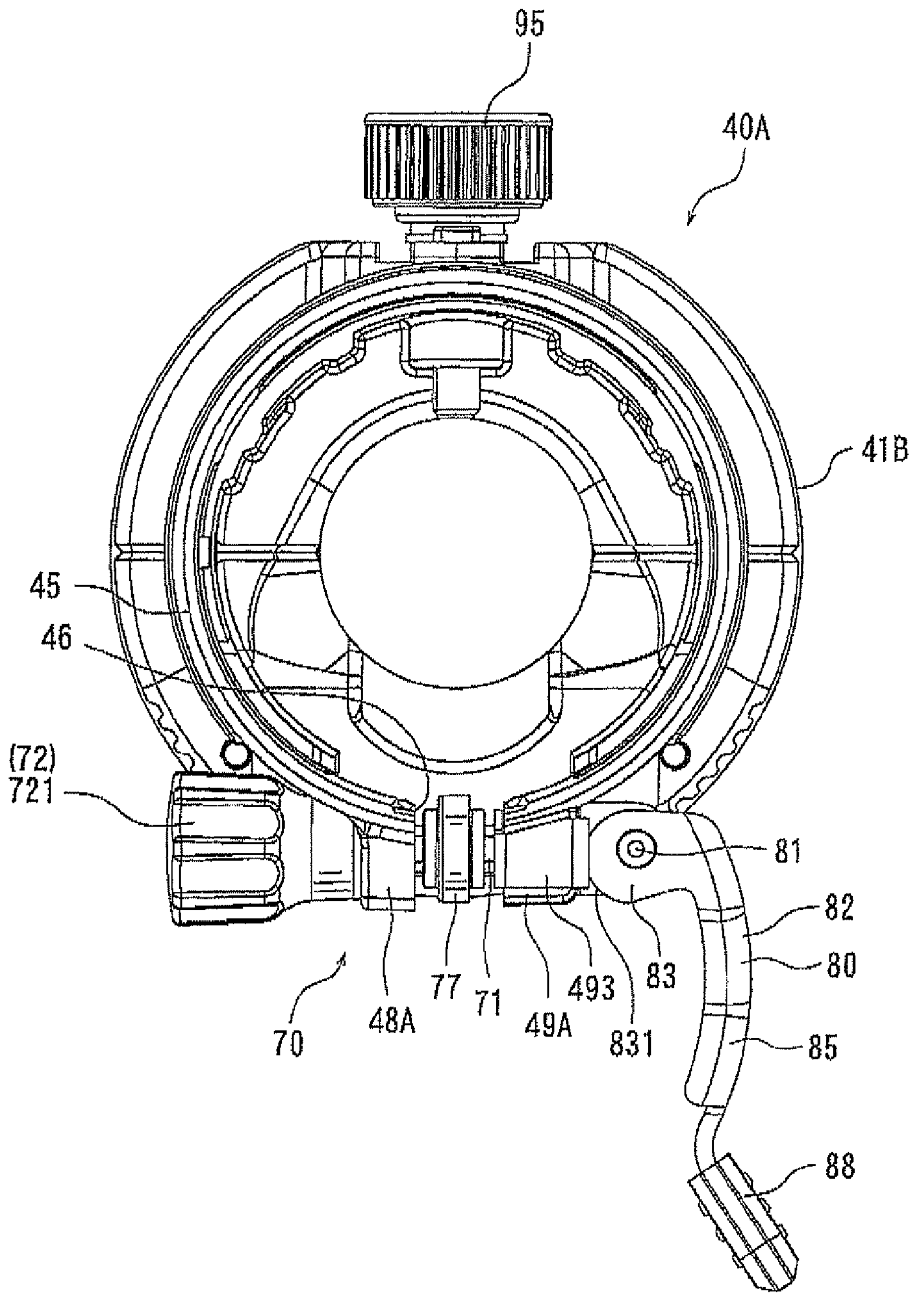
FIG. 7 is a plan view of the power tool shown in FIG. 6 but showing the power tool incorporating a fixed base in place of the tiltable base.
Figure 8:
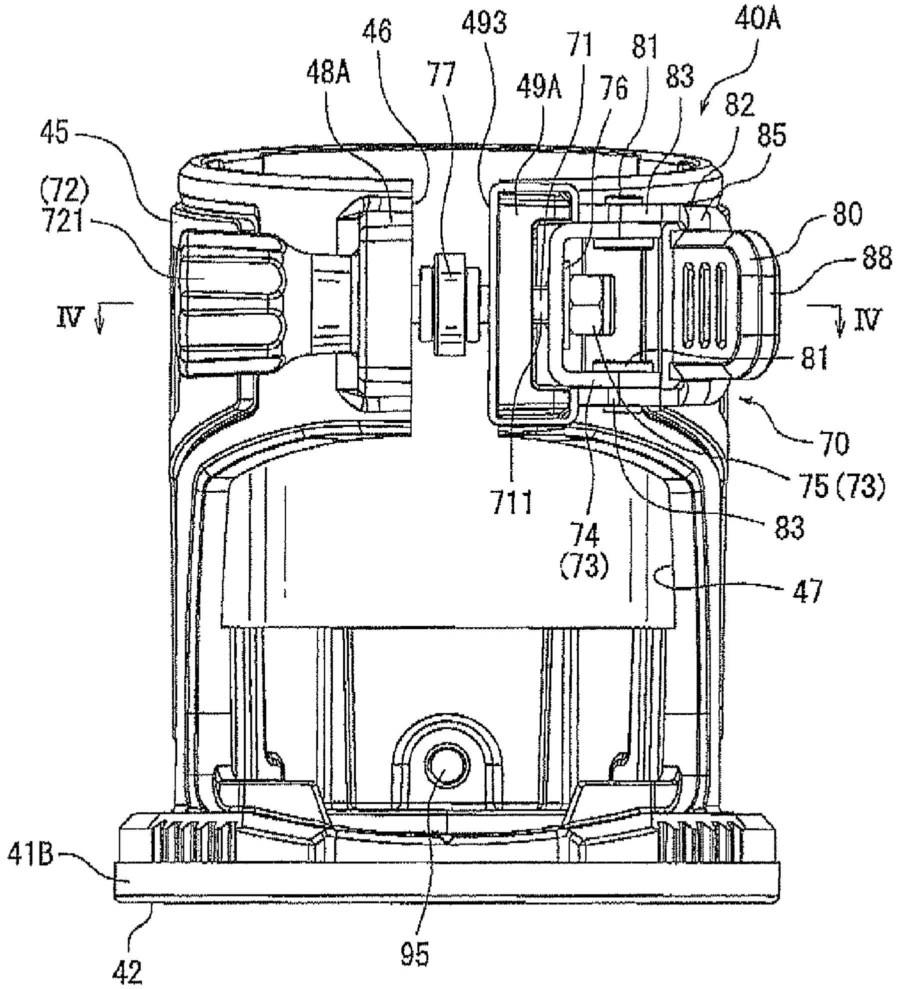
FIG. 8 is a front view of the power tool shown in FIG. 7.
Figure 9:
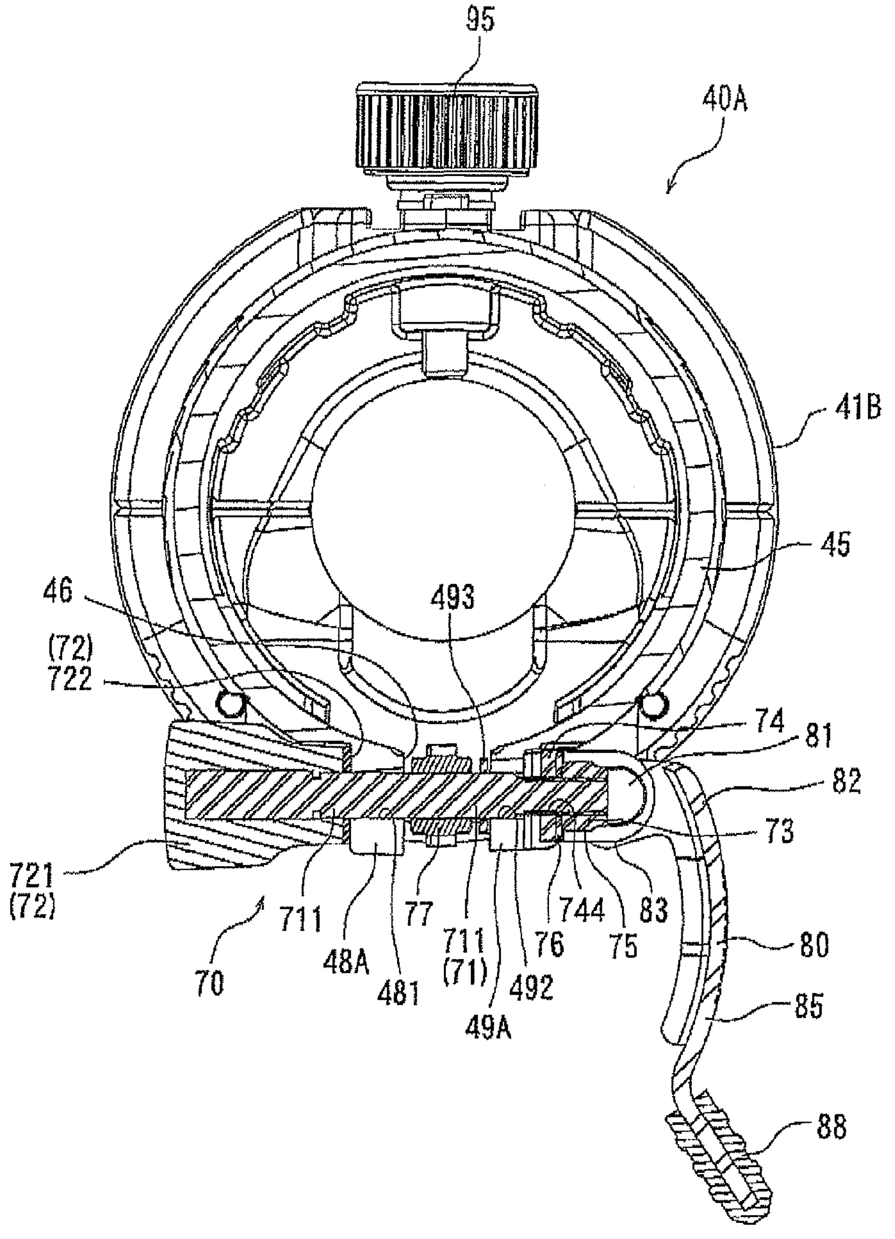
FIG. 9 is a sectional view taken along line IV-IV in FIG. 8.

Referring to FIGS. 7 to 9, in order to support the adjusting and fixing mechanism 70 (including a support shaft member 71 and a cam lever member 80 that will be described later), first and second support projections 48A and 49A are provided on the tubular holding portion 45 at positions adjacent to and on opposite sides of the slit 46 and protrude radially outward from the tubular support portion 45.

The first support projection 48A is positioned on the left side of the slit 46 and rotatably supports a portion on the side of an operation portion 72 (i.e., on the side of one end) of the support shaft member 71. As shown in FIGS. 6 and 8, the first support projection 48A is configured like a substantially rectangular piece projecting from the tubular holding portion 45. As show in FIG. 9, the first support projection 48A is formed with an inserting hole 481 that allows insertion of the support shaft member 71.

On the other hand, the second support projection 49A positioned on the right side of the slit 46 rotatably supports a portion on the side of an engaging portion 73 (i.e., on the side of the other end) of the support shaft member 71. As shown in FIGS. 6 and 8, the second support projection 49A is also configured like a substantially rectangular piece projecting from the tubular holding portion 45. As shown in FIG. 9, the second support projection 49A is formed with an insertion hole 492 that allows insertion of the support shaft member 71.

The second support projection 49A of this example is configured to be different from the second support projection 49 of the first example. In the first example, the second support projection 49 of the first example is configured to support the rotary support shaft 56 of the cam lever member 55. In contrast, the second support projection 49A of the second example is not configured to support such a rotary support shaft but is configured to simply allow insertion of the support shaft member 71 into the insertion hole 492.

As shown in FIGS. 6 and 8, a slide contact member 493 is mounted to the second support projection 49A that can slidably contact cam surfaces that are formed by outer circumferential surfaces 831 of cam portions 83 of the cam lever member 80 of the adjusting and fixing mechanism 70 when the cam lever member 80 pivots as will be explained later. The slide contact member 493 is mounted to the second support projection 49A to cover a portion of the outer periphery of the second support projection 49A, so that the outer circumferential surfaces 831 of the cam portions 83 of the cam lever member 80 can slidably contact the slide contact member 493. The slide contact member 493 also serves to prevent the second support projection 49A from being worn due to direct contact with the outer circumferential surfaces 831 of the cam portions 83.

The adjusting and fixing mechanism 70 provided on the tubular holding portion 45 will now be described. The adjusting and fixing mechanism 70 has a function as a relative position adjusting mechanism for adjusting the position of the drive unit 20 relative to the base 40A and a function as a relative position fixing mechanism for fixing the drive unit 20 in position relative to the base 40A. Similar to the first example, the support shaft member 71 of the second example is used as a part of the relative position adjusting mechanism and also as a part of the relative position fixing mechanism. Also, similar to the first example, the adjusting and fixing mechanism 70 generally includes the support shaft member 71, a pinion gear 77 and the cam lever member 80. The support shaft member 71 serves as a part of the relative position adjusting mechanism for adjusting the position of the drive unit 20 relative to the base 40A, while the support shaft member 71 and the cam lever member 80 serves as parts of the relative position fixing mechanism for fixing the position of the drive unit 20 relative to the base 40A. The pinion gear 77 is configured to be similar to the pinion gear 54 of the first example. Thus, as shown in FIG. 6, the pinion gear 77 engages the rack 28 provided on the holding surface 24 and constitutes the relative position adjusting mechanism together with the support shaft member 72.

Also in this second example, the support shaft member 72 extends along a tangential line of the outer circumferential surface of the tubular holding portion 45. More specifically, the support shaft member 51 has an operation portion 72 and an engaging portion 73 disposed at one end and the other end (the left end and the right end as viewed in FIG. 8), respectively, of the support shaft member 71 so as to be positioned on opposite sides with respect to the slit 46. One end of the support shaft member 71 on the side of the operation portion 72 is supported by the first support projection 48A by being inserted into the insertion hole 481 formed in the first support projection 48A. On the other hand, the other end of the support shaft member 71 on the side of the engaging portion 73 is supported by the second support projection 49A by being inserted into the insertion hole 492 formed in the second support projection 49A.

As shown in FIG. 9, similar to the support, shaft member 51 of the first example, the support shaft member 71 includes a shaft body 711, the operation portion 72 disposed at one end of the shaft body 711, and the engaging portion 73 disposed at the other end of the shaft body 711. The pinion gear 77 is fitted on the intermediate portion of the support shaft member 71. The operation portion 72 has a knob portion 721 capable of being grasped by the operator and a washer 722 for ensuring a manual sliding operation.

As shown in FIG. 8, the engaging portion 73 generally includes a holder bracket 74, a stopper nut 75 and a washer 76. The holder bracket 74 is configured to receive the support shaft member 71 and rotatably supports the cam lever member 80. The stopper nut 75 has a female thread that engages a male thread formed on the end portion on the side of the engaging portion 73 of the support shaft member 71. With the support shaft member 71 inserted into the holder bracket 74, the stopper nut 75 is brought to threadably engage the end portion on the side of the engaging portion 73 of the support shaft member 71, so that the holder bracket 74 is prevented from being removed from the support shaft member 71. The washer 76 is interleaved between the holder bracket 74 and the stopper nut 75 to allow the stopper nut 75 to slidably rotate relative to the holder bracket 74. The position of the holder bracket 74 relative to the second support projection 49A is determined by the position of the cam portions 83 (that apply pressing forces) of the earn lever member 80 and the position of the stopper nut 75 (that prevents the support shaft member 71 from being removed) as will be explained later.

Figure 10:
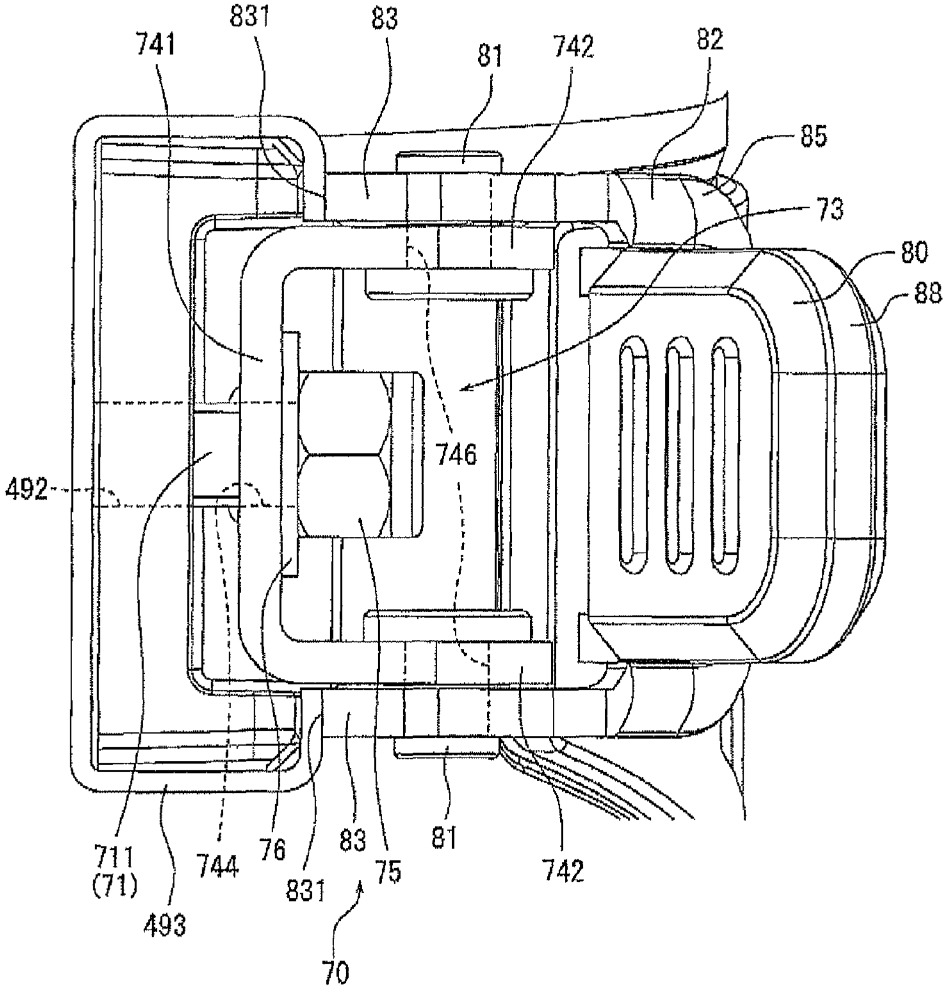
FIG. 10 is an enlarged view of a part of FIG. 8 and showing a portion on the side of an engaging portion of a support shaft member.

FIG. 10 shows an enlarged view on the side of the engaging portion 73 of the support shaft member 71 shown by a front view in FIG. 8. As shown in FIG. 10, the holder bracket 74 is configured to have a substantially laterally oriented U-shape as viewed in a front view. The holder bracket 74 includes a bracket plate portion 741 extending perpendicular to the support shaft member 71 and a pair of bracket legs 742 extending parallel to the support shaft member 71. As shown in FIGS. 9 and 10, an insertion hole 744 is formed in the bracket plate portion 74 for insertion of the support shaft member 71. The bracket legs 742 have configurations like flat plates extending parallel to the support shaft member 71 from the upper and lower ends of the bracket plate portion 741. Insertion holes 746 are formed in the bracket legs 742 for insertion of rotary support shafts 81, respectively, that pivotally support the cam lever member 80 as will be explained later. The rotary support shafts 81 inserted into the insertion holes 746 of the bracket legs 72 serve as parts of the cam lever member 80 but are integrated with the holder bracket 74, for example, by crimping or press fitting. Thus, the rotary support shafts 81 move together with the holder bracket 742.

The rotary support shafts 81 rotatably support the respective cam portions 83 to cause movement relative to the tubular holding portion 45 in response to the rotational position of the cam portions 83. Thus, the rotary support shafts 81 are separated from the tubular holding portion 45 to be able to move relative to the tubular holding portion 45 in response to the rotational position of the cam portions 83. More specifically, the rotary support shafts 81 can cause movement of the support shaft member 71 rotative to the tubular holding portion 45 in response to the movement of the cam portions 83.

The cam lever member 80 will now be described with reference to FIGS. 7 to 9. The cam lever member 80 serves as a shift device for shifting the support shaft member 71 relative to the second support projection 49A in a direction from the side of the operation portion 72 toward the side of the engaging portion 73 of the support shaft member 71 (the right direction as viewed in FIGS. 7 to 9). In addition, the cam lever member 80 constitutes the relative position adjusting mechanism together with the support shaft member 71.

The cam lever member 80 generally includes the rotary support shafts 81 integrated with the holder bracket 74, and a cam lever body 82 that is rotatably supported on the rotary support shafts 81.

As shown in FIG. 7, etc., the cam lever body 82 generally includes the cam portions 83 and an operation lever portion 85. The cam portions 83 are positioned to surround the corresponding rotary support shafts 81, and the operation lever portion 85 extends radially outward with respect to the axis of the rotary support shafts 81.

The cam portions 83 have the same configuration with each other. Each of the cam portions 83 has a shaft support hole (not shown) into which the rotary support shaft 81 is inserted. In addition, in each of the cam portions 83, a distance between the axis of the rotary support shaft 81 and the outer circumferential surface 831 varies in the rotational direction, so that the outer circumferential surface 831 serves as a cam surface. More specifically, the shape of the outer circumferential surface 831 is configured to apply a force to the support shaft member 71 in its axial direction, so that the support shaft member 71 moves relative to the tubular holding portion 45 in response to the rotational position of the cm portion 83 about the axis of the rotary support shaft 81. More specifically, as the cam lever body 82 pivots from a position adjusting position to a position fixing position, the cam portions 83 rotate to urge the support shaft member 71 in a direction from the side of the first support projection 48A toward the side of the second support projection 49A relative to the tubular holding portion 45. Here, the outer circumferential surfaces 831 of the cam portions 83 slidably contact the slide contact member 493 that is a member on the side of the tubular holding portion 45. More specifically, the outer circumferential surfaces 831 are configured to be oriented inwardly toward the slit 46 or toward a direction from the side of the second support projection 49A toward the side of the first support projection 48A with respect to the rotary support shafts 81. In other words, the outer circumferential surfaces 831 are oriented toward a direction opposite to the direction of movement of the support shaft member 71 relative to the tubular holding portion 45.

The operation lever portion 85 is configured to be able to be grasped by the operator for pivoting the cam lever body 82. The operation lever portion 85 has a configuration suitably curved to facilitate the operation by the operator. In addition, a cover 88 made of resin is attached to an end portion of the operation lever portion 85 so as to cover the end portion, so that the operator can firmly grasp the operation lever portion 85.

The outer circumferential surface 831 of each of the cam portions 83 slidably contacts the slide contact member 493 and a point of the outer circumferential surface 831 contacting the slide contact member 493 gradually changes according to the pivoting position of the cam lever body 82. The position of the holder bracket 74 including the rotary support shafts 82 relative to the second support projection 49A is determined by the removal preventing force applied by the stopper nut 75 for preventing removal of the support shaft member 71 and the pressing forces applied by the outer circumferential surfaces 831 of the cam portions 83.

When the cam lever member 80 is positioned at the relative position adjusting position (see FIGS. 7 to 9), each of the outer circumferential surfaces 831 of the cam portions 83 contacts the slide contact member 493 at a point where the outer circumferential surface 831 is spaced from the axis of the rotary support shafts 81 by a first distance. On the other hand, when the cam lever member 80 is positioned at the relative position fixing position (see FIG. 6), each of the outer circumferential surfaces 831 of the cam portions 83 contacts the slide contact member 493 at a point where the outer circumferential surface 831 is spaced from the axis of the rotary support shafts 81 by a second distance that is longer than the first distance for the relative position adjusting position.

Therefore, as the cam lever member 80 pivots from the relative position adjusting position to the relative position fixing position, the rotary support shafts 81 move relative to the second support projection 49A, so that the support shaft member 71 moves in the axial direction relative to the second support projection 49A. Thus, the support shaft member 71 and the rotary support shafts 81 move relative to the second support projection 49A in a direction from the side of the operation portion 72 toward the side of the engaging portion 73 of the support shaft member 71. More specifically, as the cam lever member 80 pivots from the relative position adjusting position to the relative position fixing position, the rotary support shafts 81 moves in the right direction as viewed in FIG. 7, so that the holder bracket 74 moves along the support shaft member 71 in the same direction. Then, the holder bracket 74 contacting with the washer 76 applies a force to the support shaft member 71 via the washer 76 and the stopper nut 75, so that the support shaft member 71 moves in the right direction. Therefore, the first support projection 48A and the second support projection 49A positioned on opposite sides of the slit 46 move toward each other. As a result, the tubular holding portion 45 is deformed to resiliently reduce its circumferential length or its diameter, so that the width of the slit 46 is narrowed. Due to decrease of the circumferential length or the diameter of the tubular holding portion 45, the tubular holding portion 45 is tightened around the holding surface 24 of the drive unit 20.

On the other hand, as the as the cam lever member 80 pivots from the relative position fixing position to the relative position adjusting position, the distance between the contact point of each of the outer circumferential surfaces 831 of the cam portions 83 and the axis of the rotary support shafts 81 is reduced from the second distance to the first distance. Therefore, the rotary support shafts 81 return to its original position relative to the second support projection 49A and the support shaft member 71 also returns to its original position relative to the second support projection 49A. As a result, the tubular holding portion 45 resiliently recovers its shape to increase its circumferential length or the diameter, so that the tightening state of the holding surface 24 of the drive unit 20 is released. Then, it is possible to change the position of the drive unit 20 relative to the base 40 by rotating the support shaft member 71 by grasping the operation portion 72 (more specifically, the knob portion 721). Thus, as the support member 71 rotates, the pinion gear 77 rotates. Because the pinion gear 77 engages the rack 28 provided on the drive unit 20, the pinion gear 77 moves along the rack 28, so that the drive unit 20 changes the position relative to the base 40. When the cam lever member 80 is in the relative position adjusting position, no pressing force or no substantial pressing force is applied to the support shaft member 71 via the washer 76 and the stopper nut 75. Therefore, the support shaft member 71 can be smoothly rotated for performing the relative position adjusting operation.

The power tool 60 of the second example as described above can achieve the same advantages as the power tool 10 of the first example. Thus, the rotary support shafts 81 that rotatably support the cam portions 83 can cause movement of the support shaft member 71 relative to the tubular holding portion 45 in response to the rotation of the cam portions 83 relative to the tubular holding portion 45. Thus, the movement of the support shaft member 71 relative to the tubular holding portion 45 can be achieved by the rotation of the cam portions 83. Therefore, the shift mechanism for shifting the support shaft member 71 relative to the tubular support portion 45 is constituted by the cam portions 83. Hence, it is possible to perform the tightening operation of the tubular holding portion 45 around the holding surface 24 of the drive unit 20 in a stable manner.

Further, in the power tool 60 of the second example, the outer circumferential surfaces 831 of the cam portions 83, which serve as cam surfaces for contacting the slide contact member 493, are oriented in a direction opposite to the direction of movement of the support shaft member 71. Therefore, the direction of forces applied by the cam portions 83 is opposite to the direction of movement of the support shaft member 71 when the tubular holding portion 45 is tightened around the holding surface 24 of the drive unit 20. Because the outer circumferential surfaces 831 for contacting the slide contact member 493 are not oriented outwardly, it is possible to provide a neat appearance.

(Possible Modifications)

The above examples may be modified in various ways. For example, although the support shaft member 51 (71) supported by the support projections 48, 49 (48A, 49A) provided on the tubular holding portion 45 is used as a common part between the relative position adjusting mechanism and the relative position fixing mechanism of the power tool 10 (60), any other part or parts than the support shaft member can be used as a common part (or common parts) instead of or in addition to the support shaft member.

Although the rack and the pinion gear are used for moving the drive unit relative to the base, any other mechanism can be used for converting the rotation of the support shaft member into the movement of the drive unit.

Further, although the tubular holding portion of the base is used as a tightening device for tightening around the holding surface of the drive unit, a separate tightening device may be mounted to the base and coupled to the support shaft member for tightening around the holding surface of the drive unit.

Further, although the rotation of the support shaft member and the axial movement of the support shaft member are used for achieving the relative position adjusting function and the relative position fixing function, respectively, any other modes of movement of the support shaft member can be used for achieving these functions. In addition, the support shaft member may be replaced with any other movable member that can move in two different modes of movement.

Further, although the drive unit has the electric motor for driving the spindle in the above examples, the electric motor may be replaced with an engine.

What is claimed is:

1. A power tool comprising:

a drive unit having a housing and a spindle and configured to rotatably drive the spindle, the spindle being configured to be able to attach a tool bit used for machining a workpiece, the housing having an outer circumferential surface; and a base configured to be placed on the workpiece, the base having a base plate configured to contact the workpiece and a tubular holding portion extending from the base plate and positioned to be opposed to the outer circumferential surface of the housing;

a relative position adjusting mechanism configured to adjust a position of the drive unit relative to the base; and a relative position fixing mechanism configured to fix a position of the drive unit relative to the base, wherein:

at least one member is used commonly between the relative position adjusting mechanism and the relative position fixing mechanism, the at least one member including a support shaft member mounted to the tubular holding portion of the base and extending in a tangential direction of the tubular holding portion;

the relative position adjusting mechanism includes the support shaft member and a rotational member mounted on the support shaft member;

the rotational member is configured to rotate along the outer circumferential surface of the housing in a direction parallel to a central axis of the drive unit, so that the position of the drive unit relative to the base changes as the rotational member rotates along the outer circumferential surface of the housing;

the support shaft member has a first end portion and a second end portion opposite to the first end portion with respect to an axial direction;

the first end portion of the support shaft member is rotatably supported by a first part of the tubular holding portion of the base;

the second end portion of the support shaft member is rotatably supported by a second part of the tubular holding portion of the base, the second part being spaced from the first part in a circumferential direction of the tubular holding portion;

the relative position fixing mechanism includes the support shaft member and is configured to be able to move the support shaft member in the axial direction, so that the first part and the second part move toward each other to reduce a circumferential length of the tubular support portion for tightening the tubular holding portion around the outer circumferential surface of the housing;

the relative position fixing mechanism further includes a shift mechanism for moving the support shaft member in the axial direction;

the shift mechanism corn rises a cam portion rotatable about a rotational axis and an operation lever portion extending from the cam portion in a radial direction with respect to the rotational axis of the cam portion;

the cam portion acts on the support shaft member to move the support shaft member in the axial direction according to the rotational position of the cam portion;

the operation lever portion is operable for rotating the cam portion; and the operation lever portion is configured to rotate about the rotational axis within a plane perpendicular to an axial direction of the tubular holding portion.

2. The power tool as in claim 1, wherein:

the rotational member is a pinion gear;

the relative position adjusting mechanism further includes a rack engaging the pinion gear; and the rack is disposed on the outer circumferential surface of the housing of the drive unit and extends along a direction of movement of the drive unit relative to the base.

3. The power tool as in claim 1, wherein:

the cam portion is rotatably supported on a rotary support shaft that moves relative to the tubular holding portion in response to the rotation of the cam portion, and the rotary support shaft is supported on the support shaft member such that the rotary support shaft urges the support shaft member to move in the axial direction relative to the tubular holding portion in response to the rotation of the cam portion.

4. The power tool as in claim 3, wherein:

the cam portion has an outer circumferential surface serving as a cam surface for contacting a contact member disposed on the side of the tubular holding portion when the cam portion acts on the support shaft member for moving the support shaft member in the axial direction; and the outer circumferential surface of the cam portion is oriented in a direction opposite to the moving direction of the support shaft member.

5. A power tool comprising:

a base;

a drive unit movable relative to the base and having a spindle and a drive device for rotatably driving the spindle;

a movable member mounted to the base and movable in a first mode and a second mode;

a first device coupled between the movable member and the drive unit and moving the drive unit relative to the base when the movable member moves in the first mode; and a second device coupled to the movable member and configured to fix the drive unit in position relative to the base when the movable member moves in the second mode, wherein:

the first mode of movement of the movable member is a rotational movement;

the second mode of movement of the movable member is a linear movement;

the movable member is a shaft member having an axis, the shaft member rotating about the axis in the first mode and moving in an axial direction in the second mode;

the second device further comprises a shift mechanism for moving the shaft member in the axial direction;

the shift mechanism comprises a cam portion rotatable about a rotational axis and an operation lever portion extending from the cam portion in a radial direction with respect to the rotational axis of the cam portion;

the cam portion acts on the shaft member to move the shaft member in the axial direction according to the rotational position of the cam portion;

the operation lever portion is operable for rotating the cam portion; and the operation lever portion is configured to rotate about the rotational axis within a plane perpendicular to a moving direction of the drive unit relative to the base.

6. The power tool as in claim 5, wherein:

the first device comprises a pinion gear mounted to the shaft member and a rack mounted to the drive unit and engaging the pinion gear.

7. The power tool as in claim 5, wherein:

the second device comprises a tightening device coupled to the base and capable of tightening around a part of the drive unit.

8. The power tool as in claim 7, wherein:

the tightening device comprises a tubular holding portion of the base;

the tubular holding portion has an inner diameter and can resiliently deform to reduce the inner diameter, so that the tubular holding portion is tightened around the part of the base.

9. The power tool as in claim 3, wherein:

the shift mechanism further comprises a bracket supported by the support shaft member so as to be rotatable relative to the support shaft member; and the cam portion is rotatably coupled to the bracket via a rotary support shaft.

10. The power tool as in claim 9, wherein:

the bracket includes a first portion rotatably couple to the support shaft member and a second portion extending in the axial direction of the support shaft member from the first portion, and the rotary support shaft is disposed at the second portion.

11. The power tool as in claim 10, wherein the second portion extends beyond the first end portion of the support shaft member in a direction opposite to the second end portion.

12. The power tool as in claim 11, wherein:

the first portion comprises a plate portion and the second portion comprises a pair of legs extending from the plate portion, so that the bracket has a U-shape; and the rotary support shaft is disposed at each of the legs.

13. The power tool as in claim 1, wherein:

the operation lever portion is rotatable between a tightening position for tightening the tubular holding portion around the outer circumferential surface of the housing and a releasing position for releasing the tightening of the tubular holding portion; and the operation lever portion extends substantially parallel to the support shaft member when the operation lever is positioned at the tightening position.

14. The power tool as in claim 5, wherein:

the shift mechanism further comprises a bracket supported by the shaft member so as to be rotatable relative to the shaft member; and the cam portion is rotatably coupled to the bracket via a rotary support shaft.

15. The power tool as in claim 14, wherein:

the bracket includes a first portion rotatably couple to the shaft member and a second portion extending in the axial direction of the shaft member from the first portion, and the rotary support shaft is disposed at the second portion.

16. The power tool as in claim 15, wherein:

the shaft portion includes a first end portion and a second end portion opposite to the first end portion in the axial direction, and the second portion extends beyond the first end portion of the shaft member in a direction opposite to the second end portion.

17. The power tool as in claim 16, wherein:

the first portion comprises a plate portion and the second portion comprises a pair of legs extending from the plate portion, so that the bracket has a U-shape; and the rotary support shaft is disposed at each of the legs.

18. The power tool as in claim 5, wherein:

the operation lever portion is rotatable between a fixing position for fixing the drive unit in position relative to the base and a releasing position for allowing movement of the drive unit relative to the base; and the operation lever portion extends substantially parallel to the shaft member when the operation lever is positioned at the fixing position.

* * * * *